United States Patent [19]

Webster et al.

[11] Patent Number: 4,525,777
[45] Date of Patent: Jun. 25, 1985

[54] SPLIT-CYCLE CACHE SYSTEM WITH SCU CONTROLLED CACHE CLEARING DURING CACHE STORE ACCESS PERIOD

[75] Inventors: Marvin K. Webster, Glendale; Richard T. Flynn, Peoria; Marion G. Porter; George M. Seminsky, both of Phoenix, all of Ariz.

[73] Assignee: Honeywell Information Systems Inc., Phoenix, Ariz.

[21] Appl. No.: 289,663

[22] Filed: Aug. 3, 1981

[51] Int. Cl.³ .................... G06F 9/36; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,735,360 | 5/1973 | Anderson et al. | 364/200 |
| 3,771,137 | 11/1973 | Barner et al. | 364/200 |
| 3,967,247 | 6/1976 | Andersen et al. | 364/200 |
| 4,056,844 | 11/1977 | Izumi | 364/200 |
| 4,142,234 | 2/1979 | Bean et al. | 364/200 |
| 4,167,782 | 9/1979 | Joyce et al. | 364/200 |
| 4,228,503 | 10/1980 | Waite et al. | 364/200 |
| 4,245,304 | 1/1981 | Porter et al. | 364/200 |
| 4,322,795 | 3/1982 | Lange et al. | 364/200 |
| 4,385,351 | 5/1983 | Matsuura et al. | 364/200 |
| 4,403,288 | 9/1983 | Christian et al. | 364/200 |
| 4,439,829 | 3/1984 | Tsiang | 364/200 |
| 4,442,487 | 4/1984 | Fletcher et al. | 364/200 |
| 4,453,216 | 6/1984 | Chiba et al. | 364/200 |

*Primary Examiner*—James D. Thomas
*Assistant Examiner*—A. E. Williams, Jr.
*Attorney, Agent, or Firm*—A. A. Sapelli; J. S. Solakian; L. J. Marhoefer

[57] ABSTRACT

In a cache memory unit including a cache directory identifying signal groups stored in an associated cache storage unit, apparatus and method are disclosed for searching the cache directory during a second portion of the cache memory cycle when the cache directory is not needed for normal operation, to determine if an invalid signal group is stored in the associated cache storage. When an invalid signal is found in the cache storage, this signal group is rendered unavailable to the data processing unit during the present cache memory cycle without interrupting the normal cache memory operation during succeeding cache memory cycles.

9 Claims, 8 Drawing Figures

Fig-1

Fig_2a

Fig_2b

SPLIT-CYCLE CACHE SYSTEM WITH SCU CONTROLLED CACHE CLEARING DURING CACHE STORE ACCESS PERIOD

BACKGROUND OF THE INVENTION

1. Field of the Invention

This invention relates generally to data processing systems and more particularly to data processing systems wherein individual central processing units include a temporary storage unit generally referred to as a cache memory.

2. Description of the Prior Art

A cache memory is a relatively small, high speed memory unit for temporary storage of information signals. The cache memory is generally implemented in such a manner that the information signals stored therein can be accessed by an associated central processing unit more rapidly than if the information signals were transferred directly from the main memory of a data processing system. Because of the more rapid information signal access capability by the central processing unit, information signals frequently used by the central processing unit are stored in the main memory unit and are duplicated in the cache memory thereby improving the performance of the central processing unit (hereafter referred to as the CPU).

Thus when the CPU requires selected groups of information signals, a directory, forming a portion of the cache memory and containing the equivalent of the main memory address of each valid group of information signals stored in cache memory, is first examined, and if the desired information signals are determined to be stored in cache memory, then the information signals are transferred from the cache memory unit to the central processor unit without accessing the main memory unit. If the selected groups of signals are not found in the cache memory unit, then the location containing those groups of signals are transferred from the main memory unit to the CPU. Depending on the strategy utilized in storing information signal groups in the cache memory, the information signals transferred to the CPU can be stored in the cache memory during the transfer from the main memory unit to the CPU.

Because a plurality of processors as well as a plurality of peripheral devices can have access to the main memory, the information signal groups currently in the main memory at a given location are subject to change and consequently the information signal groups in a cache memory unit, identified to the CPU only by an equivalent of the main memory location address, will no longer be an accurate reflection of the information signals actually at that main memory location. To avoid inconsistencies that can arise when different sets of data are identified as equivalent (i.e. the address of the main memory location where the signals are stored), the data currently stored in the main memory location is assumed to be the correct data. Information signals in the cache memory that have main memory location addresses in which the signal groups have been independently altered must be rendered unavailable to the associated CPU of the data processing system.

The operation which can accomplish this purpose is a cache memory clearing operation wherein the contents of all the cache memories are made unavailable to the CPUs whenever an operation changing data in the main memory unit is identified. However, this process is clearly inefficient because valid data and invalid data in the cache memory units are rendered unavailable to the CPUs indiscriminately.

Many data processing systems utilize segmentation and paging techniques when manipulating data in the main memory. Segments (or portions) of the main memory refer to groups of information signals having some selected relationship. The main memory segments are further divided pages which are groups of information signals (i.e. of the related segment of a predetermined dimension). Thus, in the cache memory unit that stores information signals by page address, when the information signals of a selected page address can be changed by operation involving the main memory, the related information signal having that selected page address stored in the cache memory units are rendered unavailable to the CPUs. Again, this type of invalidation or clearing of the cache memory signal groups is inefficient because of insufficient granularity of the cache memory storage location clearing mechanism.

It is also possible to provide directories that duplicate the actual directory location in the cache memory unit. The data processing system can, when specified activities are performed in the main memory, examine a duplicate directory and determine if the information signal groups stored in the related cache memory storage location can be affected by the main memory operation. In the event that the validity of the contents of the cache memory is comprised, then the contents of the actual cache memory storage location, in response to signals from the related duplicate directory, are altered so that the information signals compromised by the main memory operation are no longer available to the affected CPUs of the data processing system. This method of insuring accuracy of the cache memory contents requires a large amount of additional apparatus.

OBJECTS OF THE PRESENT INVENTION

It is an object of the present invention to provide an improved data processing system.

It is another object of the present invention to provide improved cache memory clearing for the cache memories associated with each processor of a data processing system.

It is a more particular object of the present invention to provide cache clearing for each cache memory unit of a data processing system which renders an information signal group stored in the cache memory unavailable to the related CPU when selected memory operations have addressed the main memory location of an information signal group in the cache memory unit identified by the main memory address.

It is yet another particular object of the present invention to provide clearing of signal groups at a selected location in a cache memory unit during a present cache memory unit cycle without interrupting the normal operation of the cache memory unit during succeeding cache memory unit cycles.

It is still another more particular object of the present invention to provide invalidation of signal groups in a cache memory location identified by a main memory address when a selected operation involves the main memory address, the invalidation process involving only the cache memory unit directory during portions of the timing cycle when the cache memory unit directory is not needed for normal cache memory unit operations.

SUMMARY

The aforementioned and other objects of the present invention are accomplished by providing a cache memory unit, including both a cache directory and a cache storage unit, with apparatus for performing two operations with the cache directory during a single cache memory timing cycle. During a first portion of a cache memory timing cycle, the cache memory unit directory search can be performed during a normal cache "read" or "write" operation. During a second portion of a cache memory timing cycle, when the results of the normal cache memory unit "read" directory search are being employed in an operation involving the cache storage unit or in any unused cache timing cycle, a second cache memory unit directory search is performed to determine if information signal groups, stored in a main memory location which has been addressed as part of a selected main memory operation, are presently in the cache memory storage unit. If data addressed by a selected operation in the main memory is found stored in the cache memory storage unit, then apparatus is provided to invalidate the information signal groups stored in the cache memory unit during a second portion of the succeeding cache memory timing cycle.

These and other features of the invention will be understood upon reading of the following description along with the drawings.

BRIEF DESCRIPTION OF THE DRAWINGS

FIG. 2a is a block diagram of a cache memory unit while

DESCRIPTION OF THE PREFERRED EMBODIMENT

1. Detailed Description of the Figures

Figure 1:
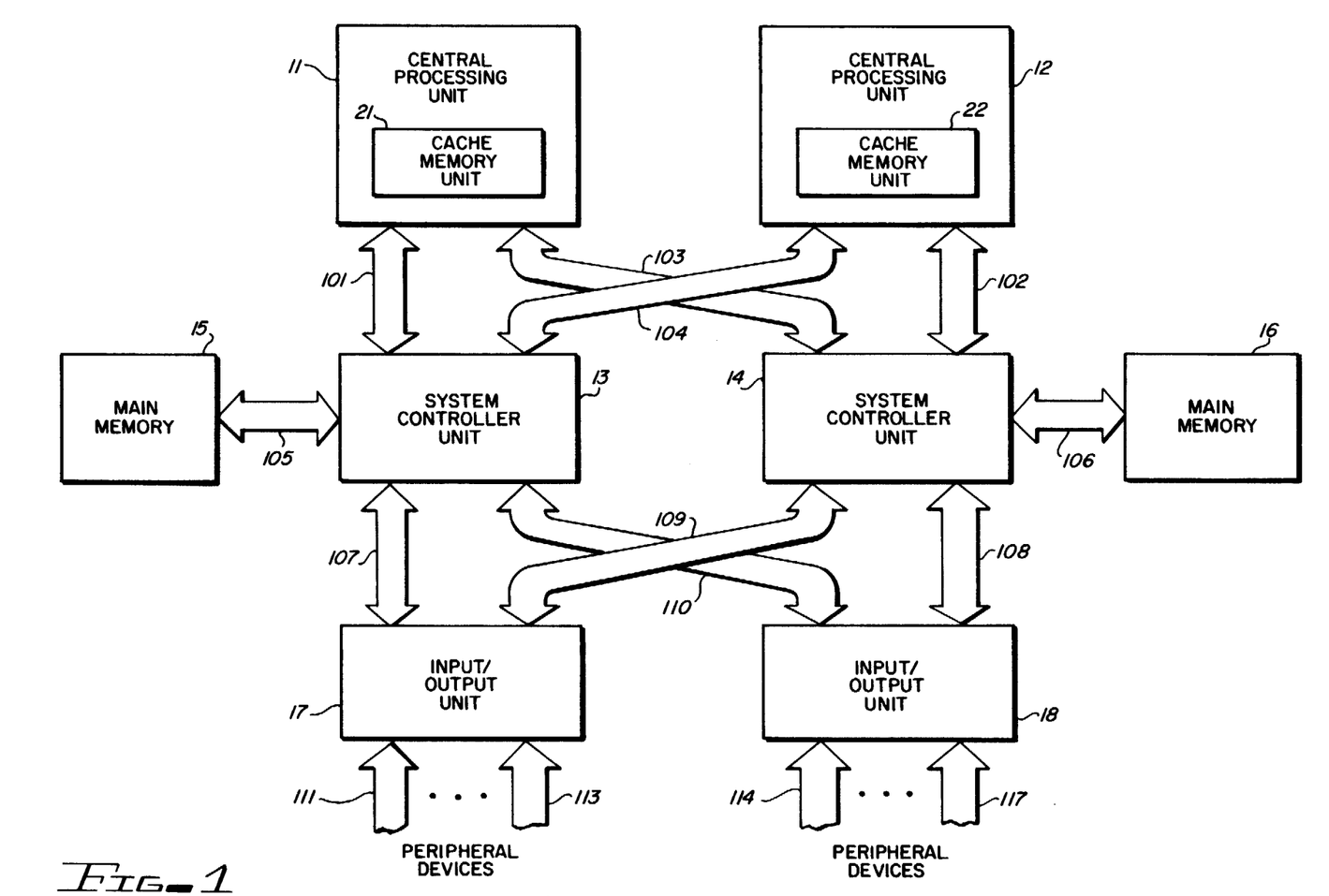
FIG. 1 is a block diagram illustrating the basic architecture of a data processing system.

Referring now to FIG. 1, the basic architecture of a data processing system is shown. A central processing unit (CPU) 11 is coupled via bus 101 to system controller unit 13 (hereinafter referred to as SCU) and is coupled via bus 103 to SCU unit 14. CPU 12 is coupled to SCU 14 via bus 102 and is coupled to SCU 13 via bus 104. SCU 13 is coupled to main memory 15 via bus 105, to input/output unit (hereinafter referred to as I/OU) 17 via bus 107, and to I/OU 18 via bus 110. SCU 14 is coupled to main memory 16 via bus 106, is coupled to I/OU 18 via bus 108 and is coupled to I/OU 17 via bus 109. I/OU 17 and I/OU 18 can be coupled to a plurality of peripheral devices via buses 111 through 117. Cache memory 21 is a portion of CPU 11 and cache memory 22 is a portion of CPU 12. In other embodiments, a data processing unit can have a single SCU which can function with either a single or a plurality of CPUs.

Figure 2A:
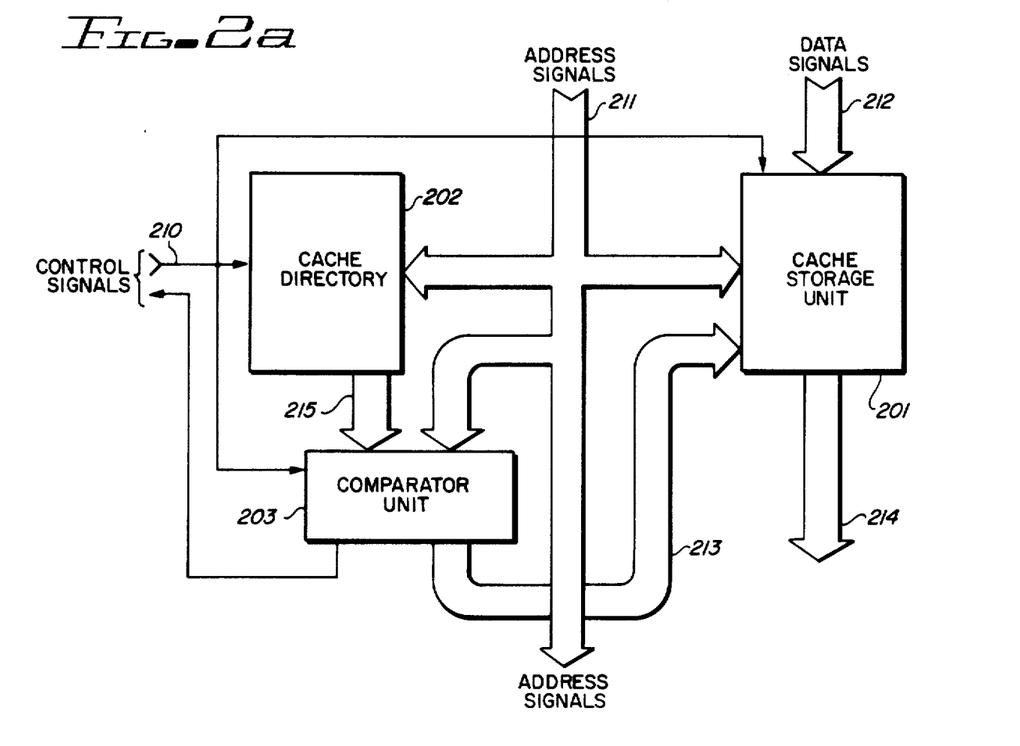

Referring next to FIG. 2a, a schematic diagram of a cache memory unit according to the preferred embodiment is shown. A group of address signals is applied to a cache directory 202, a cache storage unit 201, and comparator 203 via data bus 211. Data signal groups can be applied to the cache storage unit 201 via data bus 212 and can be extracted from the cache storage unit 201 via bus 214. The output signals of the cache directory are applied to comparator 203 via bus 215. The output signals of the comparator are applied to the cache storage unit via bus 213. Control signals 210 are applied to cache directory 202, comparator 203, and cache storage unit 201 to select the mode of operation and to coordinate the operation of the individual portions of the cache memory unit. Signals from the comparator unit are applied to control apparatus.

Figure 2B:
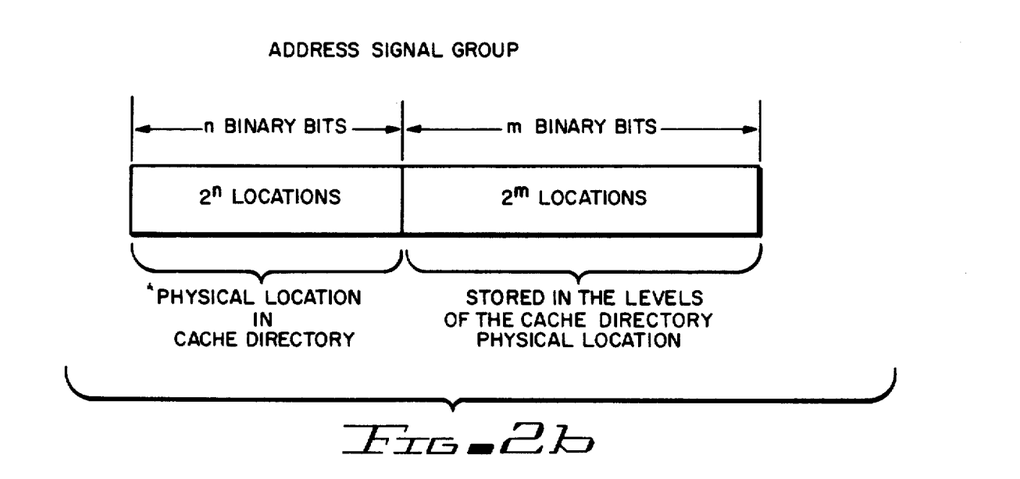
FIG. 2b illustrates an arbitrary address signal group utilized by the cache memory unit.

Referring to FIG. 2b, an address signal group in the preferred embodiment can be divided into n-bits designating a physical location of a group of levels located in the cache memory unit, and into m-bits which can be stored in one of the levels of the cache memory location.

Figure 3A:
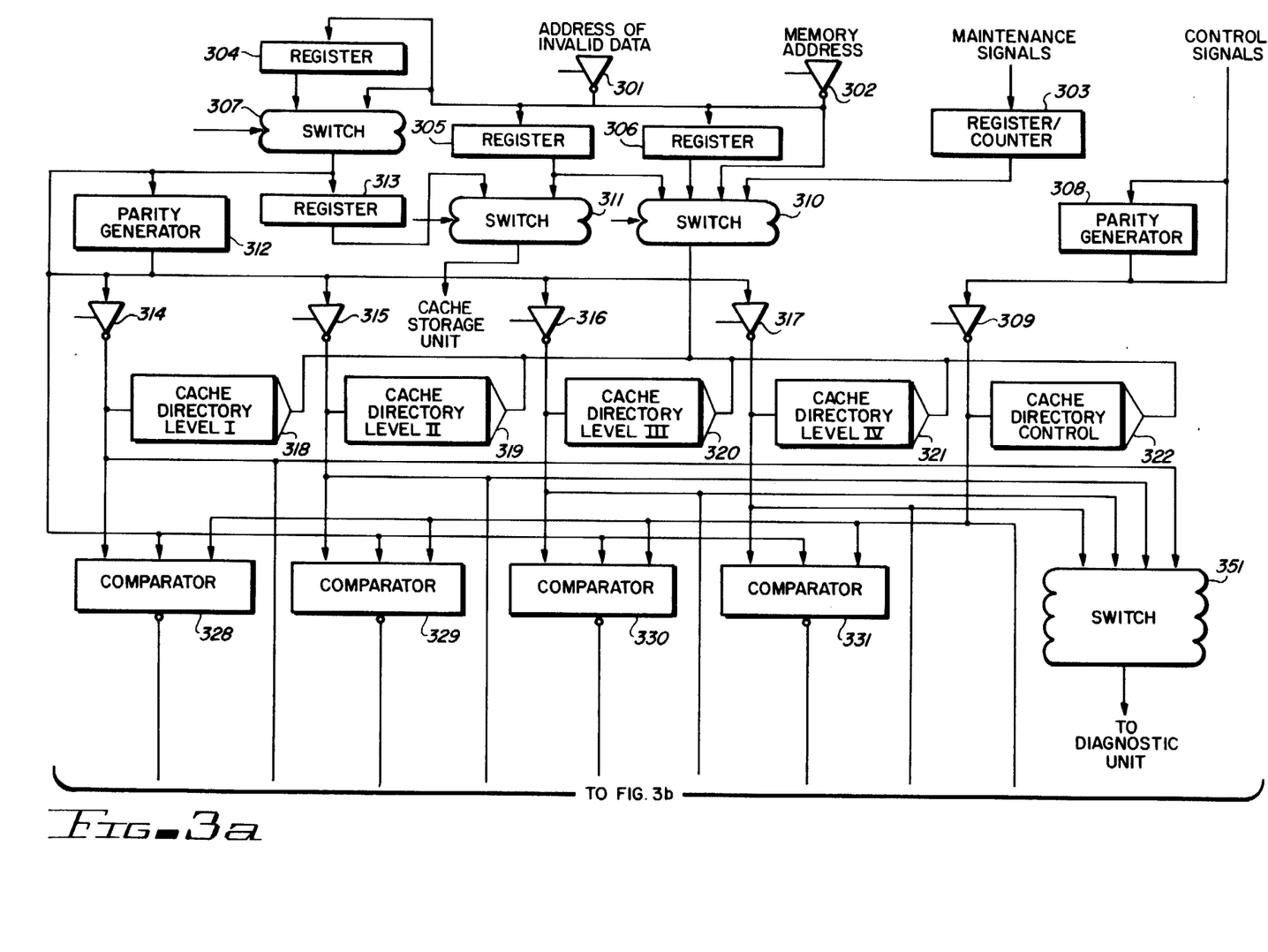
FIGS. 3a & b is a block diagram of the cache memory unit directory and associated apparatus.
Figure 3B:
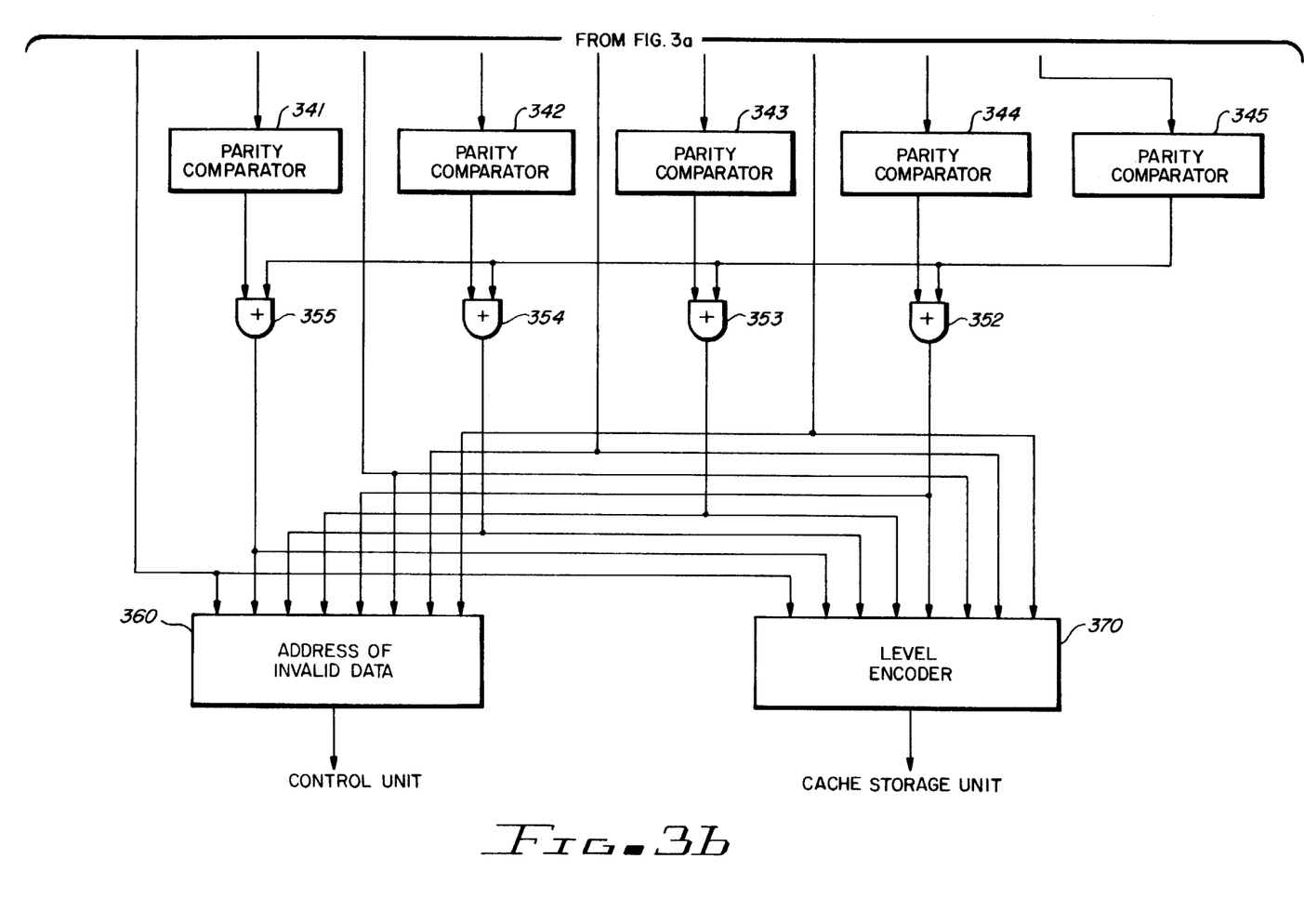

Referring to FIG. 3, a schematic diagram of the cache memory unit directory 202, comparator unit 203 and associated apparatus is shown. Output terminals of tri-state drivers 301 and 302 are coupled to register 304, register 305, register 306, switch 307 and switch 310. The output terminals of register/counter 303 are also coupled to switch 310. Output terminals of register 305 are coupled to switch 311 and to switch 310, while the output terminals of register 306 are coupled to switch 310. The output terminals of register 304 are coupled to switch 307. The output terminals of switch 307 are coupled to register 313, parity generator 312, tri-state amplifiers 314, 315, 316, and 317 and to comparators 328, 329, 330, and 331. The output terminals of register 313 are coupled to switch 311 and the output terminals of switch 311 are coupled to the cache storage unit. The output terminals of switch 310 are coupled to the address terminals of directory storage units 318, 319, 320, 321, and 322. The output terminals of tri-state amplifier 314 are coupled to the data terminals of storage unit 318, parity comparator 341, switch 351, and comparator 328. The output terminals of tri-state amplifier 315 are applied to the data terminals of storage unit 319, parity comparator 342, switch 351 and comparator 329. The output terminals of tri-state amplifier 316 are applied to the data terminals of storage unit 320, parity comparator 343, switch 351, and comparator 330. The output terminals of tri-state amplifier 317 are applied to the data terminals of storage unit 321, parity comparator 344, switch 351, and comparator 331. The output terminals of parity generator 308 are coupled to tri-state amplifier 309. Output terminals of tri-state amplifier 309 are coupled to the data terminals of storage unit 322, parity comparator 345, comparator 331, comparator 330, comparator 329 and comparator 328. The output terminals of parity comparator 345 are coupled to input terminals of logic OR gates 352, 353, 354, and 355. The output terminals of parity comparator circuit 344 are coupled to logic OR gate 352, the output terminals of parity comparator 343 are coupled to logic OR gate 353, the output terminals of parity comparator 342 are coupled to the input terminals of logic OR gate 354, and the output terminals of parity comparator 341 are coupled to the input terminals of logic OR gate 355. The output terminals of comparator 328, comparator 329, comparator 330, comparator 331, logic OR gate 355, logic OR gate 354, logic OR gate 353, and logic OR gate 352 are coupled to input terminals of invalid data address register 360 and to the input terminals of level encoder 370.

Figure 4:
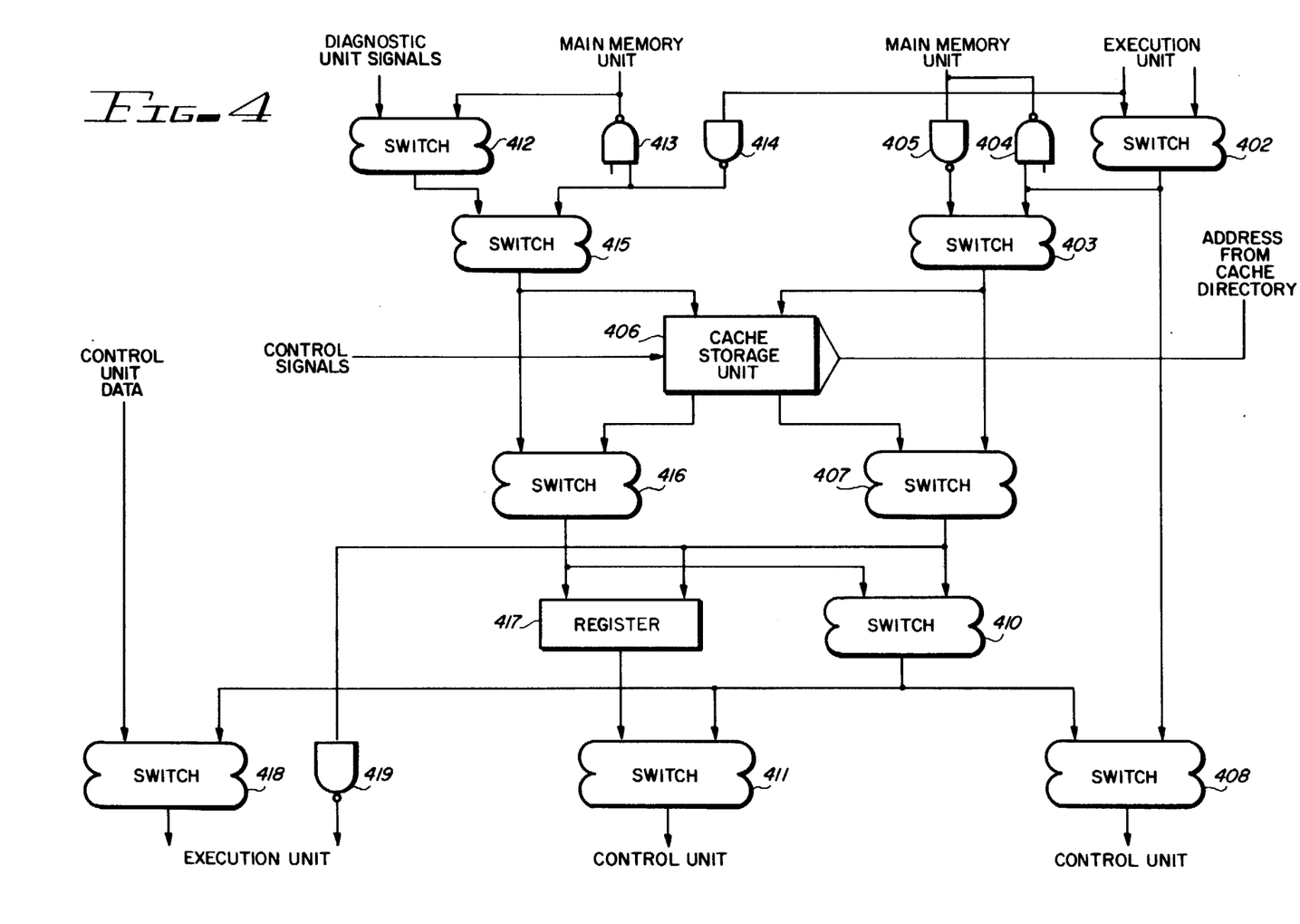
FIG. 4 is a block diagram of the cache memory storage unit and associated apparatus.

Referring now to FIG. 4, the output terminals of switch 402 are coupled to the input terminals of switch 408, switch 403 and gate device 404. Output terminals of gate 404 are coupled to input terminals of gate device 405 and output terminals of gate device 405 are coupled to input terminals of switch 403. Output terminals of switch 403 are coupled to data terminals of cache storage unit 406 and input terminals of switch 407 while output terminals of switch 407 are coupled to switch 410, to register 417 and to gate device 419. Output terminals of switch 412 are coupled to input terminals of switch 415. Input terminals of switch 415 are coupled to input terminals of gate device 413 and to output terminals of gate device 414. Output terminals of switch 415 are coupled to terminals of cache storage unit 406 and to switch 416. Input terminals of switch 416 are coupled to output terminals of storage unit 406, while output terminals of switch 416 are coupled to register 417 and to switch 410. Output terminals of switch 410 are coupled to switch 408, to switch 411, and to switch 418. Output terminals of register 417 are coupled to switch 411.

Figure 5:
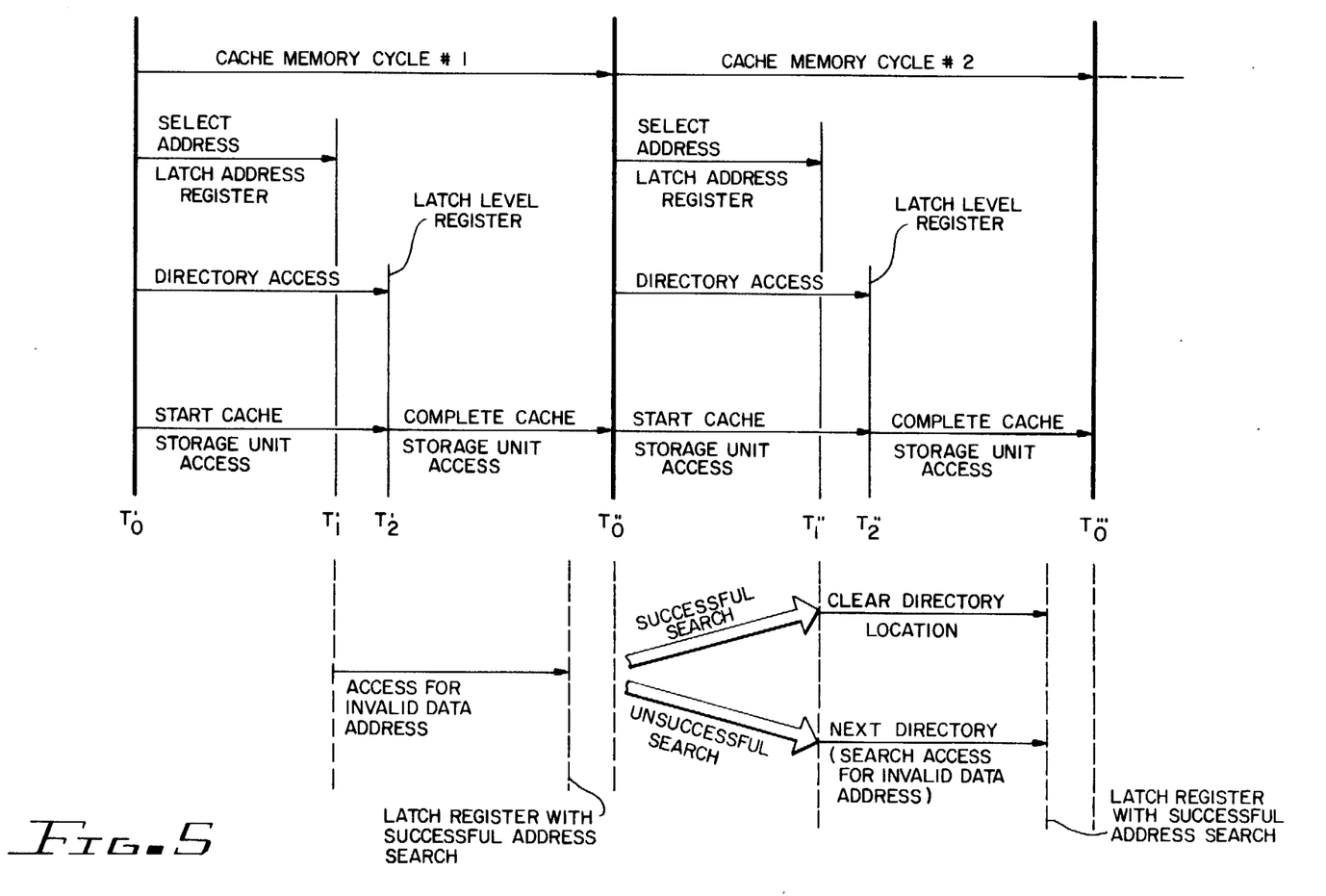
FIG. 5 is a schematic diagram of consecutive cache memory timing cycles for a cache memory unit according to the present invention.

Referring to FIG. 5, two consecutive cache memory cycles are shown illustrating the sequence during the cache memory cycle of a cache directory search and cache storage unit access. Also shown is the relationship of the cache directory search for an address containing invalid data. Upon identification of an address containing invalid data during a first cache memory cycle, the data is "cleared" from the cache memory unit during the next cache memory cycle.

Figure 6:
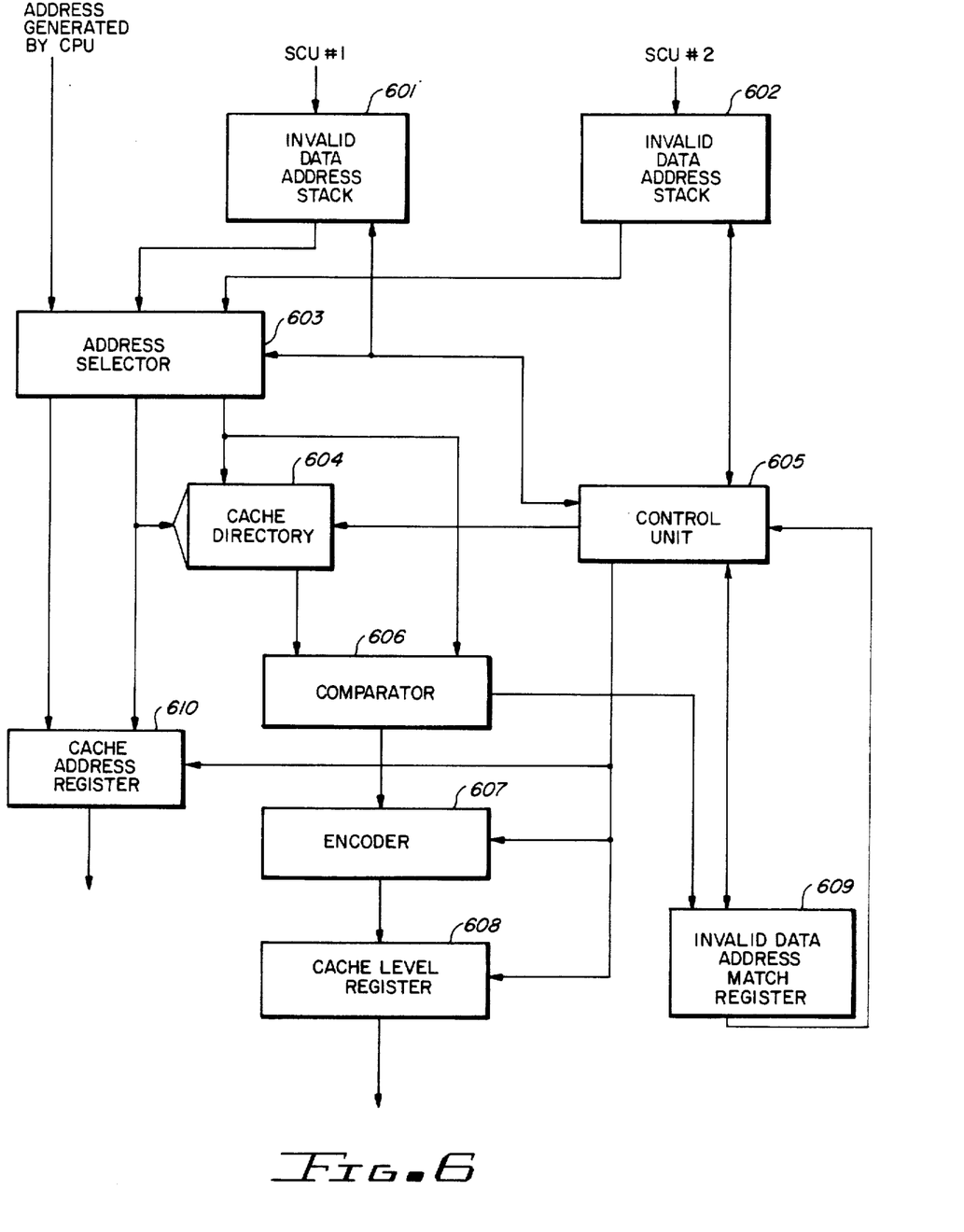
FIG. 6 is a block diagram of the cache memory unit directory and associated apparatus illustrating the cache memory timing cycles according to the present invention.

Referring to FIG. 6, a generalized diagram of the apparatus relating the apparatus of the present invention to the timing diagram is shown. Invalid data address stacks 601 and 602 are address storage registers coupled to system controller units. Address selector 603 is coupled to the central processing unit and to invalid storage address stacks 601 and 602. Address selector 603 is coupled to cache directory 604, cache address register 610 and to comparator 606. Comparator 606 is coupled to cache directory 604, encoder 607 and invalid data register 609. Encoder 607 is coupled to cache level register 608. Control unit 605 is coupled to each of the other function units for coordinating and timing the respective operations.

2. Description of the Operation of the Preferred Embodiment

The central processing unit(s) can request information from the main memory (a Read command) or can store information in a main memory (a Write command) at a selected address. The Read and Write command signals are applied to the cache memory associated with the CPU issuing the command. The Read command initiates a search in the cache directory utilizing the address which is provided by the CPU as part of the command. The address identifies a particular storage location in the main memory. If the information signals stored in the particular main memory storage location are available in the cache memory, the signal group stored in the cache memory are transferred to the CPU and the request for signal groups from the main memory is not completed. If the signal group is not found in the cache memory, as determined by a cache directory search for the main memory address, the Read command is transferred to the system controller unit and then to the main memory. The signal group at the main memory address provided by the central processing unit are transferred via the system controller unit to the central processing unit. In addition, the signal groups transferred from the main memory to the CPU are generally stored in the cache memory and the address of the main memory from which those signals were extracted is stored in the cache directory. Thus, when these signal groups are needed in another operation, these signals are now available to the CPU from the cache memory unit.

During a Write command initiated by the CPU, the signal groups written into the main memory at the location determined by the address can also be stored in the cache memory unit if found in the cache memory directory identified by the main memory location address.

To avoid inconsistencies in data processing results, all of the groups of information signals stored in the cache memory unit should reflect the corresponding signal groups stored in the main memory. Several activities can occur which result in information signal groups in the cache memory unit associated with a main memory location (i.e. through the main memory location address) being different from the information signals actually in the main memory location. For example, data from one of the peripheral devices can be transferred through a SCU to a main memory location previously containing signal groups stored in a cache memory unit and identified in the cache memory unit by the main memory location address. Similarly, when for example CPU 12 of FIG. 1 issues a Write command relative to main memory 15, associated cache memory unit 22 will store the updated version of the information signal groups at the main memory location. However, the information signal groups from this location can also be stored in cache memory unit 21 associated with CPU 11. The data in the cache memory unit 21 must either be updated or rendered unavailable to the associated CPU.

The operation of a cache memory unit according to the preferred embodiment can be understood with reference to FIG. 2a and FIG. 2b as follows. An address of a main memory location with an address including n+m binary bits (where n and m are integers) in cache directory 202 or in cache storage unit 201 are identified by two processes. n-bits of an address signal group have a physical location in the memory apparatus associated therewith. Application of the signals in the n-bits activate the associated physical location. However, the physical location of the memory apparatus include a plurality of levels, g. The n-bits applied to either the cache directory or the cache storage unit thus address g levels in either device. Each of the g levels in the cache directory can store m-bits of binary data, which along with the n-bits completely define the main memory address signal group. In the cache data memory, the n-bits plus a match of the m-bits stored in one of the levels of the cache directory identified by the n-bits define the address of a main memory signal group stored in the cache storage unit. The cache storage unit is organized in a manner similar to the cache directory. The n-bit signals will define a group of storage levels, g, which are related on a one-to-one basis with g levels in cache directory and the signal group of the main memory location will be stored in the cache storage unit level corresponding to the level in the cache directory associated with the main memory address.

With this background in mind in a Read Operation, to determine the data signal groups defined by the m-bits plus n-bits of the main memory address in the cache memory units, the n-bits (defining the location of the levels) are applied to the address mechanism of the cache directory 202 and cache storage unit 201. In the directory, the m-bits stored in each of the g levels are applied to comparator 203 and compared with the corresponding m-bits of the main memory address. When one of the levels, g', has the identical m-bits as the main memory address, signals defining the corresponding level in the cache storage unit are transferred via bus 213 and the data is read out of the cache storage unit 201 on bus 214. If the m-bits are stored in any of the levels defined by the n bits, then a control signal is generated by the comparator, to prevent an unnecessary operation of retrieving the already available signal group of the main memory location.

For a Write operation, when the m-bits of the main memory address, into which the signal group is to be stored, are stored in the level, g', in cache directory, then the signal group itself is stored in the corresponding location, g', in the cache storage unit.

In addition to the m-bits of the main memory address, the storage units of the g levels can contain control signals. For example, signals related to the replacement algorithm for storing information into g levels when the levels already have signal groups stored therein. One control signal stored in the cache directory is a full-/empty signal indicating that, when the control signal indicates full, valid data is stored in the corresponding level in the cache storage unit. However, when the control indicates empty, the corresponding level in the cache storage unit is either empty or contains an invalid signal group. The use of the full/empty control signal element eliminates the need to physically remove or clear a signal group stored in the cache storage unit which is invalid.

In the preferred embodiment, the normal operation of the cache memory unit proceeds when main memory address signals are applied to tri-state amplifier 302. The m-bits of the main memory address are applied through switch 310 to the address portion of the five memory storage units. In the embodiment illustrated in FIG. 3, there are four levels (i.e. g=4) corresponding to four storage devices. The fifth storage device 322 is arranged to store the control signals for the four levels. The n-bits, as discussed previously, address a plurality of physical storage locations in the cache directory. In each location, n-bits can be stored.

In the preferred embodiment, the storage units have two terminals, r and w, which determine whether information signal groups are stored (w) in the addressed location of the storage unit or read (r) from the address location of the storage unit. In particular, during a read operation, the tri-state amplifiers 314-317 and 309 are in the high impedance mode and the information signal groups in the location in each storage unit defined by the n-bits are applied to comparators 328-221. The m-bits so applied to the comparators are compared with m-bits from switch 307. In addition, the full/empty signal from the corresponding location in storage unit 322 is applied to the comparator. If the full/empty signal is a full indication, then the comparison can take place. If the full/empty signal is an empty indication, then the data in the cache storage unit, even if the main memory address is found in the cache directory, data is invalid and a comparison is not identified. If the full-/empty signal indicates valid data and if the output signals from storage units 318-321 when applied to switch 351 and when the m-bits of the incoming address match m-bits of one of the directory levels, the level encoder 370 transforms the directory level into address signals which will identify and activate the corresponding level in the cache storage unit (thereby providing the desired signal group).

For a write operation into one of the levels of the cache memory, control signals place the tri-state amplifiers 314-317 in a low impedance state, so that m-bits of this address signal group are applied to all the data terminals. The m-bits select a particular location for all the storage units 318-322, but the control signals activate only one w terminal on cache directory levels storage units 318-321, (storage unit 322 will always be activated) so that information signals are written only into a preselected one of the storage units 318-321 and control signals are written into storage unit 322.

In order to determine if invalid data is stored in the cache memory unit, an address is read in through tri-state amplifier 301. The operation to determine if the main memory address of the invalid data is present is similar to the read operation. When the address signal group is found stored in one of the levels of the cache memory unit directory, the full/empty signal in storage unit 322, corresponding to the identified level containing the main memory address, is altered indicating that the invalid signal group is in the corresponding location of the identified level.

Registers 304, 313, 305 and 306 provide temporary storage for information signals for operating in the cache memory unit that are not important to the practice of the invention. Register/counter 303 is used in certain maintenance functions. Parity generators 312 and 308 and parity checkers 341, 342, 343, 344, and 345 as well as AND gates 355, 354, 353, and 352 are used in assuring the integrity of the signal groups processed by the cache memory directory and associated equipment.

Referring to FIG. 4, address signals from cache directory activates a location in cache storage unit. In a cache Write operation, activated by appropriate control signals, signal groups from the CPU or from main memory are applied to a "Write" terminal through switch 403. During a "Read" operation activated by appropriate control signals, the cache storage unit signal groups from the addressed location, are applied to switch 407. In addition, a path from switch 403 to switch 407 permits the information signals to by-pass the cache memory completely and proceed directly to the CPU from the main memory. From switch 407, the signal groups can be transferred to the CPU execution unit via switch 418 and gating device 419, or can be transferred to the CPU control unit via switch 411 and switch 409. Register 417 is an instruction buffer which provides a high speed storage for storing instructions to the CPU control unit. Switch 412 generally receives signals from diagnostic apparatus and elements 415, 413, 414, and 416 are concerned with testing of the integrity of the apparatus, which is not important to the practice of the instant invention.

Referring to FIG. 5, two representative cache memory unit cycles are shown. From $T_0^1$ to $T_1^1$, a selected address is latched in the address register 313 (FIG. 3). In addition, at $T_0$ the access to the directory and to the cache storage unit are begun. By $T_2^1$, the cache directory access is completed and the level containing the location of signal groups having the selected main memory address in the cache memory is identified. The level identification is set and the access to the corresponding cache storage unit is identified. With the cache storage location completely identified, the cache data memory access is completed and the operation is complete at $T_0''$.

At $T_1^1$, tri-state amplifier 302 is inactivated and tri-state amplifier 301 is activated applying to the cache directory the main memory address of location for which signal groups have been altered and are now invalid. Between T1 and To', the main memory of the altered signal group is sought in the cache directory. If the address is found in the cache directory, an identification of the level is stored in the invalid data address register 360.

If the main memory address is not found, then at T1' of the next memory cycle the next main memory address of invalid signal group is applied to the cache memory unit. If the address of the invalid signal group is found, during the next cache memory cycle beginning at T1'' the full/empty signal for that location and level is set to empty by coupling the invalid data address register 360 to tri-state amplifier 309. When an address of invalid data is found, the address signals applied during the previous cache memory continue to be applied.

Referring to FIG. 6, when an activity of the data processing system creates an inconsistency between signal groups stored in a main memory location and a replica of those signal groups stored in cache memory, upon identification of this activity, the main memory address is stored in memory units (i.e. 601 or 602), associated with the SCU identifying the inconsistency. The storage of an address in a stack is communicated to control unit 605. During the first part of a cache memory unit cycle, an address generated by the central processing unit, is applied through the address multiplexer 603 to the cache address register and to the cache directory. The m-bits identify a location of a plurality of levels and the contents of each level in the plurality is applied to the comparator. The contents of the level are m-bits of the address and when the m-bits of the CPU address are compared with the m-bits of the level location, the comparator identifies whether the signal groups are equivalent to the CPU address signals. The level encoder 307 identifies the level in the cache storage unit and stores that level identification in the cache level encoder. Because the cache storage unit is structured in a manner determined by the level encoder, the m-bits plus the level location identify a specific signal group in the cache storage unit. During the second portion of a cache cycle, the level cache cycle, the level identification is used in the cache data memory along with the m-bits, to access a location associated with the same address as a main memory location. During this second portion of the cache memory unit timing cycle, the cache directory is available.

During this portion of the cycle, the control unit selects an address in either storage unit 601 or 602 and applies this address (i.e. m-bits) to the address portion of the directory. The contents of the cache directory levels at the addressed location are compared with the remaining portion of the storage unit address in comparator 606. If a match is not found, the control unit addresses a different location in the storage unit in anticipation for a new address search during the succeeding cache memory cycle.

If a match is found by comparator, the address in the storage unit is not changed by the control unit. The invalid data address match register stores the identification of the level having the invalid address. During the second portion of the succeeding cache memory cycle, the address (i.e. the m-bits) applied to the cache directory in the previous cycle, are reapplied. The control unit places the storage unit of the directory unit in a "write" mode and the "full" signal (indicating valid data in the cache data memory unit) associated with the identified level is changed to an "empty" signal (indicating that valid data is not stored in the associated level in the cache unit).

The above description is included to illustrate the operation of the preferred embodiment and is not meant to limit the scope of the invention. The scope of the invention is to be limited only by the following claims. A person skilled in the art can readily discern many changes and variations in the above description which are yet within the spirit and scope of the invention.

What is claimed is:

1. In a data processing system including at least one central processing unit, at least one main memory, and at least one system controller unit coupled to said central processing unit and said main memory, a cache memory unit associated with said central processing unit comprising:

a cache store unit for storing groups of data signals;

a cache directory for storing address signal groups identifying main memory locations, an address signal group being stored in said cache directory when a data signal group from said identified main memory location is stored in said cache storage unit, said cache directory including a plurality of storage groups, each storage group representing a portion of an address signal group wherein a normal operation involving said cache memory unit includes a first period for accessing said cache directory and a second period for accessing said cache storage unit, said system control unit including apparatus to identify operations altering data signals of said main memory at a preselected location;

means coupled to a system controller unit for applying a location address signal group from said apparatus identifying data signal altering operations to said cache directory during said second period of a normal cache operation;

comparator for determining when said address signal group associated with said preselected location is stored in said cache directory; and means for invalidating said address signal group associated with said preselected location in said cache directory during a succeeding second period of a normal cache operation after said determining means has found said preselected location address signal group stored in said cache directory.

2. The cache memory unit of claim 1 wherein said directory includes a signal storage means associated with each cache directory storage location identifying when a valid address is stored therein, said invalidating means applying a signal to said signal storage means to invalidate said preselected location address signal group.

3. In a data processing system including a central processing unit, a cache memory unit associated with said central processing unit comprising:

a cache storage means for storing groups of signals, each of said signal groups being a replica of a signal group stored in an associated main memory location, a system control unit coupled to said main memory, said system control unit including apparatus for identifying a main memory location address signal group altering operations in said main memory; and a cache directory for storing address signal groups of said associated main memory locations, said cache directory including a plurality of storage groups, each storage group representing a portion of said address signal group, wherein an address signal group applied to said cache directory during a first portion of a cache memory unit cycle will cause said replica signal group to be applied to output terminals of said cache storage means during a second portion of said cache memory cycle when said associated main memory location address signal group is in said directory, said cache directory coupled to said system control unit;

said cache directory including a comparator for determining when a predetermined main memory location address signal group is stored in said cache directory by applying said predetermined address signal group to said cache directory during a second portion of said cache memory unit cycle, said cache directory including means for invalidating said main memory location replica signal groups associated with said predetermined address signal group during a second portion of a next cache cycle.

4. A cache memory unit of a data processing unit for delivering a group of data signals to output terminals in response to a group of address signals applied to input terminals during a cache memory cycle period comprising:

a cache storage unit for storing data signal groups in cache storage unit locations, said data signal groups applied to said cache memory unit output terminals in response to application of cache storage location signal groups to said cache storage unit, each of said data signal groups being associated with an address signal group;

a cache directory including a plurality of storage locations said storage locations divided into a plurality of storage location groups, each storage location group representing an address signal, said cache directory further including a comparator, said storage locations storing said address signal groups when associated data signal groups are stored in said cache storage unit, wherein application of an address signal group to said comparator of said cache memory unit during a first portion of said cache memory cycle period causes an associated cache storage location signal group to be applied to said cache storage unit during a second portion of said cache memory cycle period, said cache directory comparator identifying a cache memory location storing a selected address signal group when said selected address signal group is applied to said cache memory unit during said second portion of said cache memory cycle, said cache directory including invalidation means, said invalidation means activated to render data signal groups associated with said applied selected address signal groups unavailable said invalidation means activated during a second portion of a successive cache memory cycle period, and wherein said data processing unit includes a system control unit coupled to said cache directory, said system control unit including apparatus for identifying address signal groups of memory locations having altered data signals.

5. A cache memory unit of claim 4 wherein said invalidation means includes apparatus for changing a status signal associated with said cache directory location containing said selected address signal group.

6. A cache memory unit associated with a central processing unit of a data processing system, said cache memory unit operating during a cache memory timing cycle, comprising:

a cache directory including first means including a comparator responsive to a first plurality of preselected address signal group for generating preselected first signals, said first means enabled during a first portion of said cache memory unit timing cycle;

second means including said comparator responsive to said first plurality of preselected address signals for generating second signals, said second means enabled during a second portion of said cache memory timing cycle, third means responsive to said second signals during a second portion of a successive cache memory unit timing cycle for inhibiting generation of said first signals by a first preselected address signal said cache directory including a plurality of storage groups, each of said storage groups representing an address signal;

a cache storage unit for storing a data signal group associated with each of said first plurality of address signal groups wherein said first signals resulting from application of a one of said plurality of preselected address signal groups causes said associated data signal group to be provided to said data processing unit; and a system control unit for identifying address signals of altered main memory locations, said system control unit address signals applied to said second means.

7. A method for selective clearing of a cache memory unit comprising the steps of:

a. storing data signal groups in said cache memory unit b. indexing said stored data signal groups by an associated address signal group stored in said cache memory unit;

c. comparing an address signal group applied during a first portion of a cache memory unit timing cycle to said stored address signal groups by means of a comparator;

d. extracting, during a second portion of an index cycle for said cache memory, said data signal group indexed by said associated memory address signal group when said applied address is stored in said cache memory unit;

e. identifying an address signal group of altered data signal main memory location;

f. comparing an address signal group from said system control unit applied during a second portion of said cache memory timing cycle with said stored address signal groups by means of said comparator; and g. preventing extraction during a second portion of a next cache memory timing cycle of data signal groups from said cache memory unit when a stored address signal group is the same as an applied signal group.

8. A method for selective clearing of data signal groups stored in a cache memory unit comprising the steps of
   a. dividing a cache memory unit timing cycle into two portions;
   b. applying an address signal group to a directory unit of said cache memory unit during a first portion of said cache memory unit timing cycle,
   c. when said applied address signal group is associated with a one of said data signal groups stored in said cache memory unit, extracting said associated data signal group from said cache memory unit;
   d. applying an address signal group to said directory unit of said cache memory during a second portion of said cache memory unit timing cycle; and
   e. when said applied address signal group applied during a second portion of said cache memory timing cycle is stored in said cache memory directory, clearing said second portion applied address signal group from said cache memory unit during a second portion of a successive cache memory unit timing cycle.

9. A cache memory unit associated with a central processing unit of a data processing system comprising;
   a group of storage locations for storing data signal groups; and
   a directory unit storing address signal groups when data signal groups associated with said address signal groups are stored in said storage locations said directory unit including a plurality of storage units, each of said plurality of storage units representing an address signal, said directory identifying when a selected address signal group associated with said stored data signal group is applied to a cache memory unit comparator during a first portion of a cache memory unit timing cycle, said directory unit identifying when a location in said directory unit stores an address signal group equivalent to a predetermined address signal group applied during a second portion of said cache memory comparator timing cycle, said directory unit including apparatus for invalidating said stored predetermined address signal group during a second portion of a successive cache memory unit timing cycle, and
   a system control unit for identifying said predetermined address signal group when data signals in an associated main memory location are altered.

* * * * *